Figure 1:
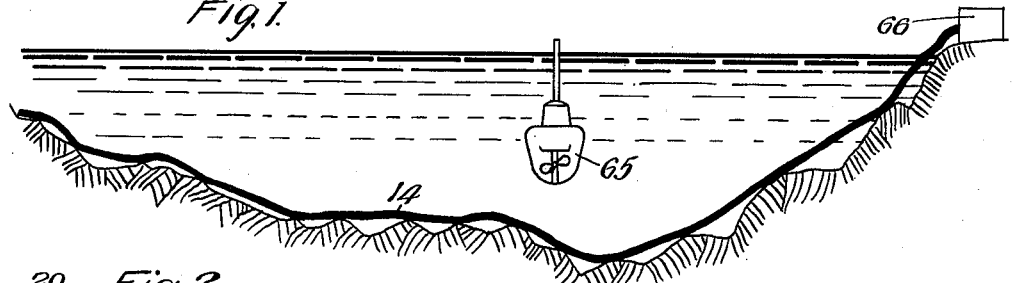

Oct. 27, 1925.

M. C. BEEBE 1,558,826

ELECTRICAL TESTING SYSTEM

Filed Feb. 21, 1920    2 Sheets-Sheet 1

Inventor:
Murray C. Beebe.
by Joel C. R. Palmer, Atty.

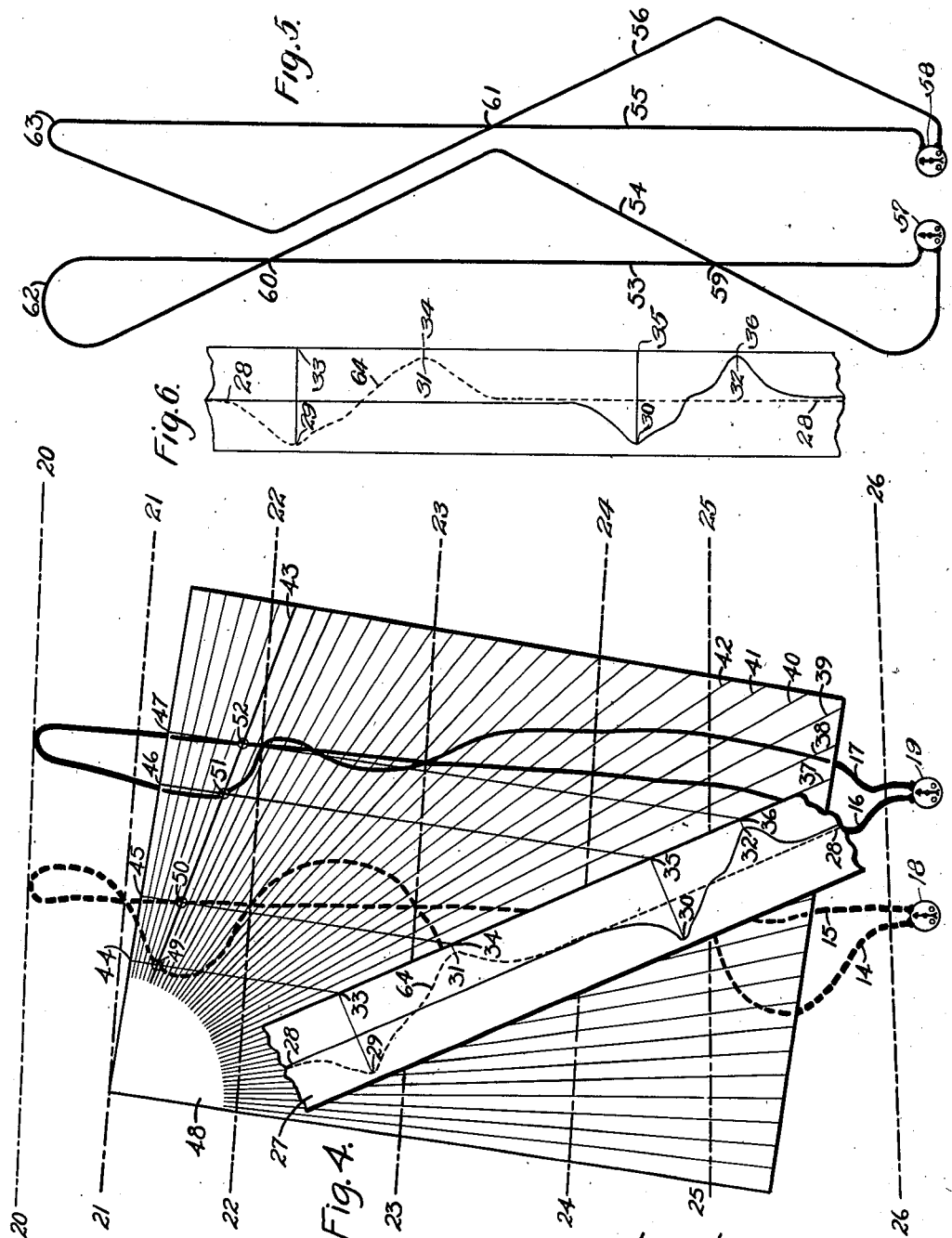

Patented Oct. 27, 1925.

1,558,826

UNITED STATES PATENT OFFICE.

MURRAY C. BEEBE, OF NEW YORK, N. Y., ASSIGNOR TO WESTERN ELECTRIC COMPANY, INCORPORATED, OF NEW YORK, N. Y., A CORPORATION OF NEW YORK.

ELECTRICAL TESTING SYSTEM.

Application filed February 21, 1920. Serial No. 360,308.

To all whom it may concern:

Be it known that I, MURRAY C. BEEBE, a citizen of the United States, residing at New York, in the county of New York, State of New York, have invented certain new and useful Improvements in Electrical Testing Systems, of which the following is a full, clear, concise, and exact description.

This invention is related generally to electrical testing systems and more particularly to magnetic detecting systems.

The object of the invention is to provide a method of locating moving magnetic bodies such as submarine vessels.

The invention provides in its preferred form an electrical loop or series of loops laid under water where vessels, especially submarines, are apt to pass. These loops may be connected in series relation to each other and terminate at a shore station where they are connected to a galvanometer or other sensitive current indicating means or such means may be used for each loop separately. Steel vessels have magnetic fields which, in crossing the loops, cause induced currents in the loops which currents are indicated at the galvanometer means. An observer is thus able to accurately determine in point of time the passing of such a vessel over a portion of the loop.

The loops used in such installations are necessarily long, covering a considerable amount of territory, and, therefore, it becomes necessary that the location of the vessel be more accurately determined in order that it may be pursued. To accomplish this object in accordance with this invention, the loops are divided into a number of sectors within the limits of each of which a characteristic sequence of galvanometer deflections is produced.

The galvanometer deflections due to the passage of a vessel over a loop with no transpositions therein are always the same regardless of the vessel's direction of approach. Thus, if two such loops are used, as a vessel passes over the loops four galvanometer deflections are observed two in each galvanometer. Each galvanometer will record a right and a left deflection as viewed from the observer's position. The order in which such deflections occur depends upon the way in which the loops happen to be placed and the poling of the galvanometers but they will always be in the same sequence. A vessel passing in the opposite direction will produce a series of deflections in which the pairs of deflections are reversed.

If each loop is properly transported at intervals, sectors may be formed in which characteristic combinations of deflections are produced for each sector. The number of characteristic combinations available depends on the number of loops employed.

In practice, it is impossible to lay cables accurately under water in any very definite position and for this purpose it has been found more practical to first lay the cable approximately in the desired location and then by surveying methods locate and chart the layout. The configuration of such a layout usually shows variations from the form proposed. These variations assist rather than hinder the locating of a vessel's path.

Assuming that a vessel's speed is uniform during its passage over the loops and that it travels in a straight line, then the time intervals between the crossings over the various legs are proportional to the straight line distances between these legs. Having located the ship in the proper sector it is then necessary only to locate a path across that sector in which the distances between the legs of the loops are proportional to the time intervals between the corresponding galvanometer deflections. The path thus located ought to approximate the course of the vessel.

The course of a vessel is graphically located in accordance with this invention in its preferred form by laying off on one of a series of radial lines drawn on a transparent sheet, points at distances proportional to the time intervals between the galvanometer deflections; drawing parallel lines through these points so as to cut the other radial lines in proportional lengths; and then fitting the transparent sheet over the chart of the corresponding loop sector so that the distances cut by parallel lines on some one of the radial lines coincide with corresponding distances between the legs of the loops. That line so found will be the approximate course of the vessel.

Figure 2:
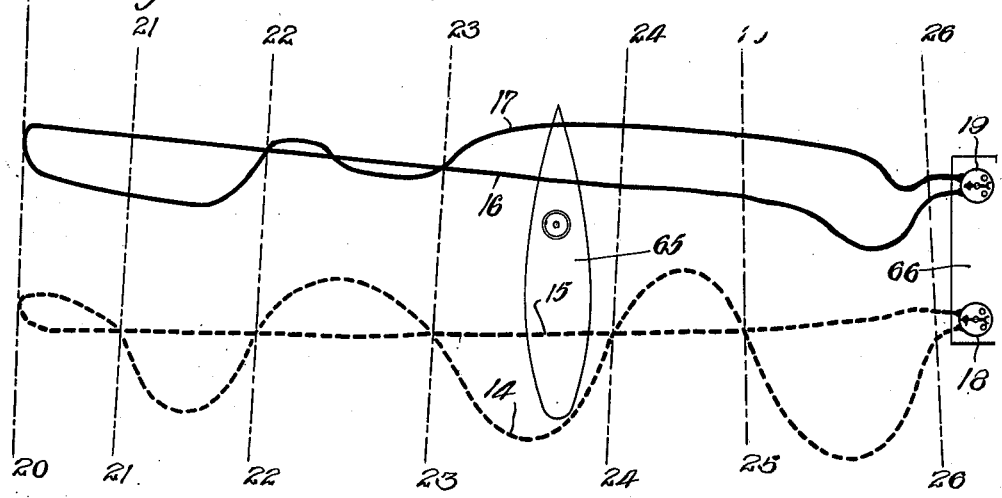
Figure 3:
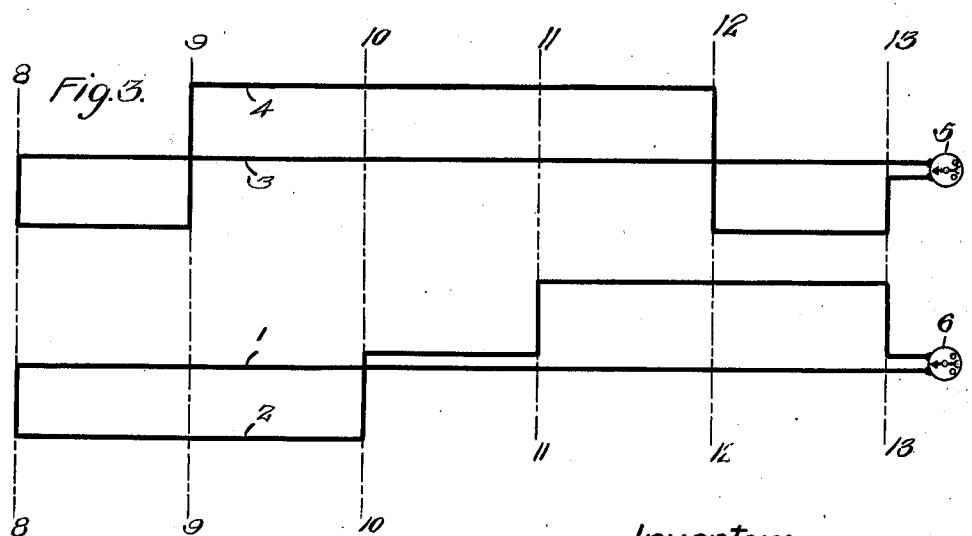

The invention may be better understood by reference to the drawings which show its preferred embodiment. Fig. 1 is a vertical section through a vessel channel or harbor entrance showing an application of this invention; Fig. 2 is a plan view of the same; Fig. 3 shows an ideal layout of the loops to form sectors, and Fig. 4 shows the method of applying a galvanometer record to a chart of a loop layout to determine the course of a vessel thereon. Fig. 5 shows a layout having particular advantages, and Fig. 6 shows a galvanometer deflection record.

Figs. 1 and 2 show a submarine 65 crossing the detecting loops comprising the respective legs 14, 15, 16 and 17, arranged on the channel bed and connected to galvanometers 18 and 19 located in an observation station 66 on shore.

Fig. 3 shows a system of two loops which are composed of the legs 1 and 2, and 3 and 4 respectively. Legs 1 and 2 are connected to a galvanometer 6, and legs 3 and 4 are connected to the galvanometer 5. Other sensitive current indicating means may be employed for this purpose but a galvanometer has been found to produce the most satisfactory results.

A vessel passing over the legs 1 and 3 produces deflections in the galvanometers to the left as viewed from the observer's position. Similarly a vessel passing over the legs 2 and 4 produces galvanometer deflections to the right.

If the system be divided in zones or sectors by lines 8, 9, 10, 11, 12, and 13, cutting the loops in such a way that each of the lines passes through a transposition point in one or the other of the legs 1, 2 or 3, 4, then a vessel passing from left to right as viewed from the observer's position through each of the sectors thus formed will produce a characteristic order of galvanometer deflections as indicated by the following table:

| Sector between lines. | Galvanometer deflections. | |
|---|---|---|
| | Galv. 6. | Galv. 5. |
| 8-9 | Right, left | Right, left. |
| 9-10 | Right, left | Left, right. |
| 10-11 | Neutral | Left, right. |
| 11-12 | Left, right | Left, right. |
| 12-13 | Left, right | Right, left. |

In passing from right to left as viewed from the observer's position the deflections will be the same except that the galvanometer 5 will record first. The vessel's direction of approach will be indicated by observing which galvanometer records first.

In Fig. 2 and Fig. 4, are shown loops having the legs 14, 15, 16 and 17. Legs 16 and 17 are connected to galvanometer 19, and legs 14 and 15 are connected to galvanometer 18. The galvanometers 18 and 19 are poled so that a vessel in passing from left to right as viewed from the observer's position over legs 15 and 16 gives galvanometer deflections to the left, and a vessel in passing in the same direction over legs 14 and 17 give deflections to the right.

The loops are divided into sectors as in the case of the loops of Fig. 3, by the lines 20, 21, 22, 23, 24, 25, and 26. A vessel passing from left to right as viewed from the observer's position through these sectors will give galvanometer deflections as shown in the following table:

| Sector between lines. | Galvanometer deflections. | |
|---|---|---|
| | Galv. 18 | Galv. 19 |
| 20-21 | Left, right | Right, left. |
| 21-22 | Right, left | Right, left. |
| 22-23 | Left, right | Neutral. |
| 23-24 | Right, left | Left, right. |
| 24-25 | Left, right | Left, right. |
| 25-26 | Right, left | Left, right. |

Recording galvanometers are preferably used for the purpose of recording deflections. The galvanometers used herein record simultaneously on the same strip of photographic paper moving at a uniform rate of speed. Fig. 6 represents a galvanometer record indicating the passage of a ship across the loop system of Fig. 2 and Fig. 4. On the paper strip 27 is traced the records 64 and 28 of the galvanometers 18 and 19 respectively, in which the peaks 29 and 30, represent deflections to the right. The peaks 31 and 32 represent deflections to the left. By referring to the above table we find that a series of deflections right, left on galvanometer 18, followed by deflections right, left on galvanometer 19 indicate that vessel is passing from left to right and through the sector between lines 21 and 22.

Since the speed of the strip 27 is maintained constant the time intervals between the peaks 29, 31, 30 and 32 are proportional to the distance intervals at which the legs 14, 15, 17 and 16 respectively intersect on the vessel's path through the sector between lines 21 and 22. Therefore if these time intervals are laid off on a line 37 at points 33, 34, 35, and 36, and parallel lines 44, 45, 46, and 47 be drawn across radial lines 38, 39, 40, 41, 42, and 43 etc., the intercepts on these radial lines are proportional to the distance intervals on the vessel's path. The radial lines 37, 38, 39 to 43, etc., are drawn on a celluloid or other transparent sheet 48 so that the sheet 48 may be slid over the chart of the loop system without obscuring it. Thus it will be seen that the intercepts 49, 50, 51, and 52 on the radial line 43 coincide with the legs 14, 15, 17, and 16 indicating that the line 43 represents the vessel's path.

Fig. 5, shows an ideal form for loops of this character. The loops are composed of the legs 53 and 54, and 55 and 56 respectively. Legs 53 and 54 are transposed at points 59 and 60 and legs 55 and 56 are transposed at point 61. As in the case of the loops of Fig. 3, the legs 53 and 54 are connected to galvanometer 57 and legs 55 and 56 are connected to galvanometer 58. The advantage of this method of laying out the cable lies in the fact that no two straight line courses across the four legs will give a series of similar deflections of the galvanometer. Sectors divide the system as follows:

A sector including courses intersecting legs 53 and 54 between point 60 and the end point 62 and legs 55 and 56 between points 61 and 63;

A sector including courses intersecting legs 53 and 54 between points 59 and 60 and legs 55 and 56 between points 61 and 63;

A sector including courses intersecting legs 53 and 54 between points 59 and 60 and legs 55 and 56 between point 61 and the galvanometer station; and a sector which includes courses intersecting legs 53 and 54 between point 59 and the galvanometer station and legs 55 and 56 between point 61 and the galvanometer station.

These sectors have overlapping ranges and the angle at which the vessel crosses the system is greater than that allowed in Fig. 2 or Fig. 3 without rendering the galvanometer record confusing.

The method of determining the course of the vessel as hereinbefore described may be applied to the system shown in Fig. 5 with greater advantage due to the regularity of the varying distances between the various legs.

What is claimed is:

1. A submarine detecting system comprising a plurality of submerged conductive loops, each said loop being characteristically transposed to form with another loop a series of observational sectors, and electro-responsive means connected to said loops and responsive to current impulses induced therein.

2. A submarine detecting system comprising a plurality of submerged conductive loops, each loop being characteristically transposed to form with another loop a plurality of observational sectors, and means for obtaining a single record showing the electrical impulses induced in each of the loops.

3. The method of indicating the path of a moving magnetic body across a given space which comprises providing the space with a plurality of electrical conducting loops transposed to form observational sectors, detecting current pulses set up in said loops, obtaining a measure of the time interval between said current pulses, providing a chart showing the layout of said loops, and drawing a line on said chart so that the loops intercept distances on said line which are proportional to the time intervals between said current pulses.

4. The method of indicating the path of a moving magnetic body across a given space which comprises providing the space with a plurality of electrical conducting loops transposed to form observational sectors, obtaining a graphical time record of current pulses set up in said loops, providing a chart showing the layout of said loops, and drawing a line on said chart so that the loops intercept distances on said line which are proportional to the distances between said current pulses on said graphical record.

5. The method of indicating the path of a moving body across a given space which comprises providing the space with a plurality of electrical conducting loops transposed to form observational sectors, obtaining a graphical record of current pulses induced in said loops, laying off on a straight line intervals which are proportional to the time intervals between said pulses, providing a chart showing the layout of said loops, superimposing said line upon said chart and drawing parallel lines from the dividing points of said line to the conductors of said loop.

6. The method of indicating the path of a moving magnetic body across a given space which comprises providing the space with a plurality of electrical conducting loops transposed to form observational sectors; detecting current pulses set up in said loops; obtaining a measure of the time interval between said current pulses; providing a chart showing the layout of said loops; and drawing a line on the proper sector of said chart, as indicated by the said responses, so that the loops intercept distances on said line which are proportional to the time intervals between said current pulses.

In witness whereof, I hereunto subscribe my name this 19th day of February A. D., 1920.

MURRAY C. BEEBE.